(12) United States Patent
Masters et al.

(10) Patent No.: US 6,328,346 B1
(45) Date of Patent: Dec. 11, 2001

(54) FLEXIBLE MECHANICAL JOINT

(75) Inventors: Randy W. Masters, Houston; Cecil M. Brandon, Jr., Spring, both of TX (US)

(73) Assignee: Advanced Industrial & Marine Services, Houston, TX (US)

( * ) Notice: Subject to any disclaimer, the term of this patent is extended or adjusted under 35 U.S.C. 154(b) by 0 days.

(21) Appl. No.: 09/255,169

(22) Filed: Feb. 22, 1999

(51) Int. Cl.$^7$ .................................................. F16L 27/10
(52) U.S. Cl. .............................. 285/223; 285/47; 138/140
(58) Field of Search .................. 285/223, 47; 138/140, 138/141, 149, 156

(56) References Cited

U.S. PATENT DOCUMENTS

| | | | |
|---|---|---|---|
| 3,178,088 | * | 4/1965 | Herr ........................................ 138/140 |
| 3,419,291 | * | 12/1968 | Tomb et al. ....................... 138/141 X |
| 3,443,599 | * | 5/1969 | Klein ...................................... 138/140 |
| 3,563,572 | | 2/1971 | French ...................................... 285/47 |
| 4,006,920 | | 2/1977 | Sadler et al. ............................ 285/14 |
| 4,151,865 | * | 5/1979 | Lehrer ............................... 138/140 X |
| 4,221,239 | | 9/1980 | Reale ..................................... 138/149 |
| 4,287,245 | | 9/1981 | Kikuchi .................................. 428/36 |
| 4,415,184 | | 11/1983 | Stephenson et al. ................... 285/47 |
| 4,423,778 | | 1/1984 | Goldsmith ............................ 166/134 |
| 4,538,834 | * | 9/1985 | Brady et al. ....................... 285/47 X |
| 4,790,570 | | 12/1988 | De Gruijter ............................ 285/54 |
| 5,088,772 | | 2/1992 | Van Dijck ............................... 285/47 |
| 5,141,259 | * | 8/1992 | Highlen et al. .................. 285/223 X |
| 5,722,462 | | 3/1998 | Dridi et al. ............................ 138/149 |
| 5,913,325 | * | 6/1999 | Helmsderfer ...................... 285/47 X |

* cited by examiner

Primary Examiner—Suzanne Dino Barrett
(74) Attorney, Agent, or Firm—Fulbright and Jaworski L.L.P.

(57) ABSTRACT

A flexible mechanical joint is disclosed for joining a first elongated structural section with a second elongated structural section. The joint is compressible and expandable at least along a substantially longitudinal direction upon movement of at least one of the first and second sections. The joint includes a first connecting portion fixedly attached to the first section and a second connecting portion fixedly attached to the second section. The joint also has a flexible member that connects the first connecting portion with the second connecting portion and is positioned between the two connecting portions. The flexible member is shiftable upon relative longitudinal movement between the first and second sections. At least one of the first and second connecting portions includes an anchoring member frictionally engaging one of the first and second sections and including a lip that is secured into the one section. Further, the first and second connecting portions define at least one variable space therebetween and the variable space has a longitudinal length or volume that varies in response to relative movement between the first and second sections along the substantially longitudinal direction. Further, the flexible member is rotatable within the variable space upon relative substantially longitudinal movement between the first and second sections. Further yet, the mechanical joint may be positioned within the variable space to divide the variable space into a first variable subspace and a second variable subspace.

10 Claims, 6 Drawing Sheets

FLEXIBLE MECHANICAL JOINT

FIELD OF THE INVENTION

The present invention relates generally to a flexible mechanical joint and, more particularly, to a flexible mechanical joint for interconnecting at least two movable wall sections such as sections of pipeline insulation or sections of road pavements. The invention is particularly, but not exclusively, adapted to joining sections of substantially rigid pipeline insulation. However, it should be noted that, although the detailed description provided herein is directed primarily to a joint for joining of substantially rigid thermal insulation systems on pipelines and also to a joint for joining of sections of concrete pavements, such detailed description is provided for convenience and exemplary purposes and should not serve to limit the invention.

BACKGROUND OF THE INVENTION

A mechanical joint may be provided as a structural interface between two elongated structural sections when it is, otherwise, not practical to provide or construct a continuous section thereof. Examples of elongated structural sections to which the present invention is applicable include cylindrical sections of substantially rigid thermal insulations, relatively flat sections of substantially rigid insulations, thermally elongatable or otherwise movable structural walls, panels, pavements, and decking, and the like. Typically, there are certain manufacturing, installation and/or environmental constraints which necessitate using a sectioned design as opposed to a continuous design. For example, there is often a limit to the length that the elongated section may be constructed in place. Such is the case in the construction of sections formed from a construction material such as concrete which must be finished and/or shaped before the material dries or sets in place.

In other applications, the elongated section(s) may have a tendency to elongate or contract due to thermal conditions. Thus, expansion room between sections must be provided. In this regard, it is often advantageous to minimize the length of the sections so as to minimize the potential elongation and the structural stresses which can be associated with such elongation. Further, flexible mechanical joints may be provided as the structural interface between the two movable elongated sections so as to absorb the movement between the two sections and to minimize the stresses generated in the sections as a result of such movement. The flexible mechanical joint also functions to fill the gap between the sections and to provide some uniformity at interface of the two sections.

A thermal insulation system may be provided on a product pipeline to maintain the temperature of the product transported therethrough. The insulation system may function to maintain the temperature of the transported fluid below the temperature of the external environment, such as in the case of the transportation of crude oil, natural gas, or petroleum products such as LPG or benzene. In the alternative, the insulation system may function to maintain the temperature of the transported fluid above the temperature of the external environment. Such an insulation system is provided on steam lines and also on some hydrocarbon pipelines such as, for example, subsea hydrocarbon pipelines.

Pipeline insulation systems suitable for low or high temperature applications come in a variety of forms and may utilize a variety of insulation materials. Typically, the primary properties considered in selecting the insulation material are the material's resistance to heat transfer and its cost.

In some applications, it may also be desirable to provide insulation systems having high structural rigidity and a high compressive strength. This is particularly desirable in the application of insulation on subsea hydrocarbon applications wherein the insulation system is subjected to high hydrostatic pressures. Accordingly, the substantially rigid insulation system should have a compressive strength sufficiently high to withstand the stresses created by such hydrostatic pressures. In this regard, insulation made of a syntactic composite and having a compressive strength in excess of about 3000 psi has proven effective.

SUMMARY OF THE INVENTION

It is a general object of the invention to provide a mechanical joint for joining or interconnecting two movable elongated structural sections such as sections of rigid insulation or sections of road pavements. A significant feature of the inventive mechanical joint is a flexibility sufficient to absorb the movement of the adjacent structural sections, particularly movement along a generally longitudinal direction.

With respect to one embodiment of the invention applicable to insulated pipelines, the installation of such an insulated pipeline is illustrated in FIG. 1. Important to application of the present invention, the pipeline may be directed downward from a vessel in a manner wherein, initially, the section of pipeline immediately downward of the vessel takes a curve, concave configuration relative to the ocean floor. Further downward, the pipeline takes on a more convex configuration relative to the ocean floor, before being laid substantially flat or horizontally across the ocean bottom. As is typical in the prior art, each section of pipeline insulation is substantially rigidly or frictionally attached to the outside surface of the pipe. Accordingly, the insulation must also bend with the pipe or pipeline, e.g., when it is being laid across the ocean floor (as illustrated in FIG. 1). In prior art methods, the tendency of the pipeline to bend or flex in this manner exerts compressive or tensile stress on the rigid insulation. Combined with the high hydrostatic pressure present in a deep ocean environment, there is a tendency for cracks to propagate or fractures to be initiated in the pipeline insulation system. As a result of the cracks or fracture failures, the integrity of the insulation system is compromised and the operation of the pipeline system is hampered.

Accordingly, one embodiment of the invention is an improved insulation system that is generally applicable in the conditions present in the deep ocean environment.

In one aspect of the invention, a flexible mechanical joint is provided for coupling, interconnecting, interlocking and/or joining a first elongated structural section (e.g, a concrete pavement section or a cylindrical section of insulation) with a second elongated structural section. The inventive joint is compressible and expandable at least along a substantially longitudinal direction upon movement of at least one of the first and second sections. For purposes of clarity, the referenced longitudinal direction is defined as a direction that is substantially parallel to a longitudinal line along which the two sections and the joint are substantially aligned, when the joint is disposed in a non-flex condition. In a pipeline insulation application, this longitudinal direction is substantially parallel with the longitudinal centerline of the pipe.

The joint includes a first connecting portion fixedly attached to the first section and a second connecting portion fixedly attached to the second section. The joint also has a flexible member that connects the first connecting portion with the second connecting portion and which is positioned between the two sections. The flexible member, which is preferably a substantially flat elongated member, is shiftable (e.g., rotatable relative to the first and second connecting portions) upon relative longitudinal movement between the first and second sections. Preferably, at least one of the first and second connecting portions includes an anchoring member frictionally engaging one of the first and second sections. For example, the anchoring member may have a lip that is secured into the one section.

As another feature of the mechanical joint, the first and second connecting portions define at least one variable space therebetween. The variable space has a longitudinal length or volume that varies in response to relative movement between the first and second sections along the substantially longitudinal direction. Further, the flexible member is rotatable within the variable space upon relative substantially longitudinal movement between the first and second sections. Further yet, the mechanical joint may be positioned within the variable space to divide the variable space into a first variable subspace (e.g, a V-shaped space) and a second variable subspace. In some applications, i.e., a subsea pipeline insulation system, a pressure equalization passage may be provided through the flexible member to fluidly communicate the first subspace with the second subspace.

In one embodiment, the connecting portions and the flexible member are substantially annularly configured for mounting of the mechanical joint about a substantially cylindrical member (e.g., a pipeline). The mechanical joint is preferably formed from a plastic material and may include a first semi-annular section and a second semi-annular section which are configured to mutually interlock to form the substantially annular member. Further, at least one of the semi-annular sections includes at least one tongue member and the other semi-annular member includes at least one groove, and the tongue and groove are mutually engageable to interlock the semi-annular sections (e.g., about the pipeline).

A flexible mechanical joint according to the present invention exhibits such properties as durability, resiliency, manufacturability, toughness, and ease of assembly. The present invention also features an improved design of a flexible mechanical joint that is adaptable to various applications including, but not limited to, rigid insulation systems and road pavements.

In another embodiment of the present invention, an insulation system is provided which is securable about an outer surface of a cylindrical member such as a pipeline. The system includes a first substantially cylindrical section of insulation disposed about a first portion of the outer surface of the cylindrical member, a second substantially cylindrical section of insulation disposed about a second portion of the outer surface of the cylindrical member, and at least one flexible mechanical joint interconnecting the first and second sections of insulation. The mechanical joint may have some or all of the features described above.

In another aspect of the inventive insulation system, each of the sections of insulation includes a substantially rigid insulation material, such as a syntactic composite. Further, a slip fabric (e.g., a polyethylene sheet) may be positioned between the sections of insulation and the outer surfaces of the cylindrical member so as to facilitate longitudinal movement of the flex joint and said sections of insulation relative to the cylindrical member. In an alternative embodiment, the insulation system further includes a substantially rigid outer cylinder (e.g., a PVC pipe or other plastic) covering the insulation material.

In another embodiment of the invention, a mechanical joint having some or all of the features described above is provided as an interface between two sections of road pavements (e.g., concrete pavements). In this embodiment, the mechanical joint is particularly adapted to functioning as a thermal expansion joint.

DETAILED DESCRIPTION OF THE DRAWINGS

Figure 1:
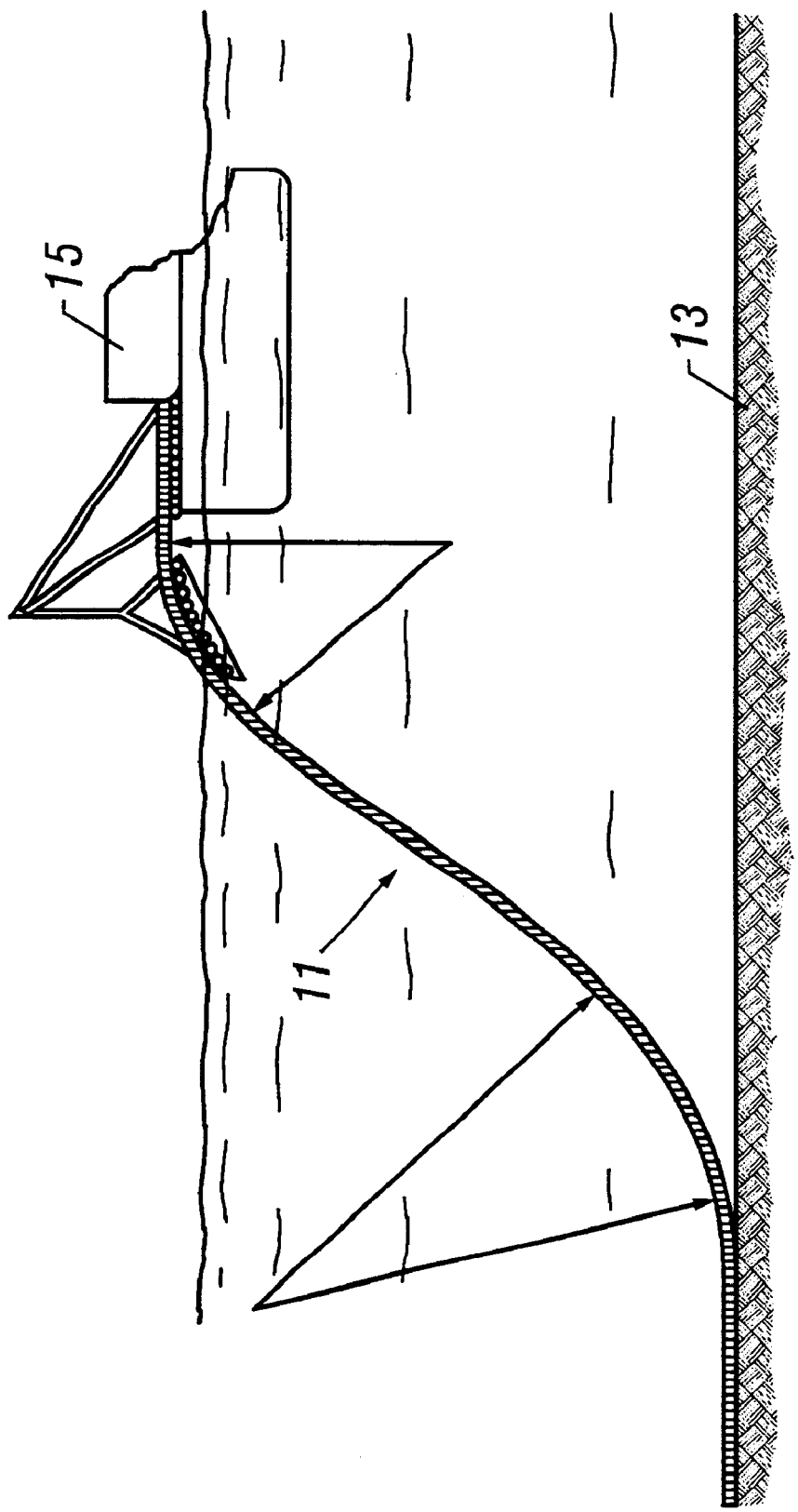
FIG. 1 is an elevation view of an insulated pipeline being installed across an ocean floor.

FIG. 1 illustrates a typical method of laying an insulated product pipeline 11 across an ocean floor 13. A pipe laying vessel 15 is provided with the equipment and manpower to weld or string a pipeline 11 together and to feed or direct the pipeline 11 into the ocean environment. In FIG. 1, the pipeline 11 is shown being directed from the bow of the vessel 15 in a manner whereby, the section of pipeline 11 positioned immediately downward of the vessel 11 takes on a curved, concave configuration relative to the ocean floor 13 and the pipeline 11 is in bending mode. Further downward and immediately before the pipeline 11 is supported primarily by the ocean bottom 13, the pipeline takes on a curved, convex configuration relative to the ocean floor 13 and the pipeline 11 is also in a bending mode. Across the ocean floor 13 and supported primarily by the ocean floor 13, the installed pipeline 11 is disposed substantially horizontally and/or takes on a configuration that corresponds substantially with the adjacent ocean bottom terrain.

The pipeline 11 is preferably insulated with an insulation system utilizing a rigid or substantially rigid type insulation material 17 such as a syntactic composite having a relatively high compressive strength or, at least, a compressive strength suitable for the ocean bottom depths at which the pipeline 11 is to be situated. The insulation system, which may be applied on the deck of the vessel 11, comes in discreet cylindrical sections of the rigid or substantially rigid insulation 17. In prior art systems, when the pipeline 11 is in bending mode (such as shown in FIG. 1), the insulation system must also bend to some degree. The present invention provides an insulation system having features that minimize the impact of such bending on the insulation system.

Hereinafter, the phrase or terms "rigid insulation" or "substantially rigid insulation" shall refer to insulation systems or insulation materials having sufficient structural rigidity to resist compression, substantial deformation and/or collapse when subjected to significant external pressure. Types of rigid or substantially rigid insulation shall include, but shall not be limited to, syntactic composites, other similar rigid composites, concrete, PVC-covered non-rigid insulation, and the like. Rigid and substantially rigid insulation shall not include uncovered or exposed urethane and polyurethane foams, common fiberglass insulation, and cold tar wrapping. Further, the scope of the terms or phrase "rigid" or "substantially rigid insulation" shall include, but shall not be limited to, insulation that is completely deformable or substantially deformable even under relatively high stress levels.

In one aspect of the invention, an insulation system according to the present invention "floats" relative to the rigid pipe. More specifically, the insulation system is allowed to move in the longitudinal direction relative to the longitudinal centerline of the pipe (or vice-versa), thereby minimizing the frictional engagement between the insulation system with the outer surface (not shown in FIG. 1) of the pipe. Thus, as the pipeline 11 is directed vertically downward into the ocean (as shown in FIG. 1), the outer surface of the pipe is allowed to slip (to some degree) relative to the insulation system and, in this way, the effect of bending of the pipe on the insulation system is minimized. This aspect of the invention is discussed further below with respect to the description of the basic components of the insulation system.

Figure 2:
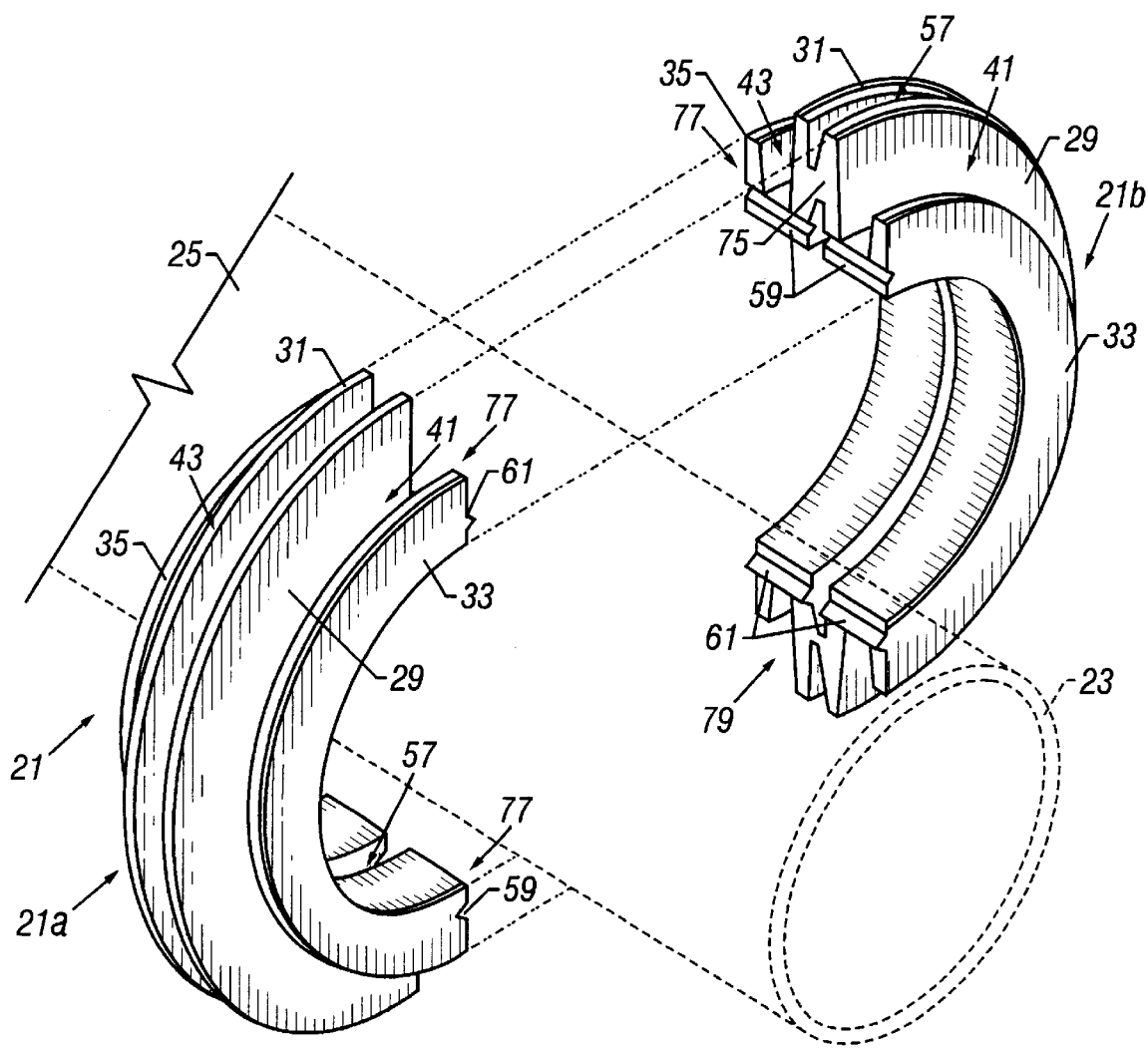
FIG. 2 is a perspective view of a mechanical joint according to the invention.
Figure 3:
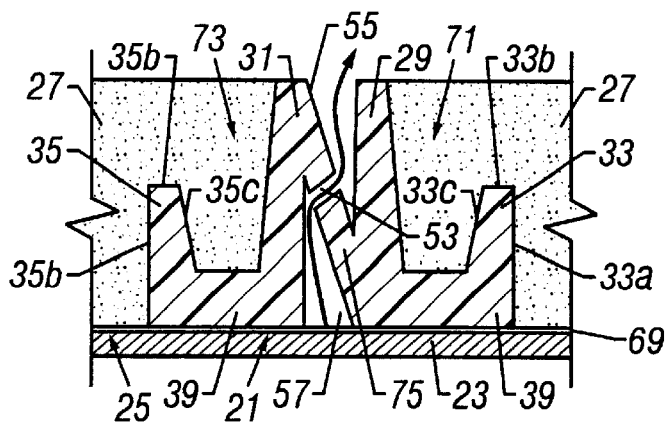
FIG. 3 is a cross-sectional view of the mechanical joint installed on an outer surface of a pipeline and connecting two sections of insulation.

FIG. 2 depicts a section of a pipeline or pipe 23 having installed thereon an insulation coupling or mechanical joint 21 embodying the invention. Hereinafter, the terms "mechanical joint" shall mean a structural interface provided between two separate elongated sections (e.g., wall sections) and which is preferably engaged with both sections but preferably attached to at least one of the sections. The mechanical joint 21 preferably comprises two semi-annular members 21a, 21b which are mutually engageable and connectable to fit over an outer surface 25 of the pipeline section 23. Referring also to FIG. 3, the mechanical joint 21 is installed on the pipeline section 23 to mechanically interconnect or join two elongated cylindrical wall sections of insulation 27 which cover the pipeline section 23, thereby forming an insulation system according to the invention.

To facilitate manufacturing and assembly, the two joint members 21a, 21b are preferably substantially identical in structure. In particular, each joint member 21a, 21b is formed from a plastic material such as urethane or polyurethane. For installations in ocean depths of about 1000' and deeper, a plastic should be selected that preferably has a compressive strength in excess of about 3,000 psi and a shore A hardness of about 95. In addition, it is desirable that the material selected for the mechanical joint 21 exhibit a minimum degree of flexibility and toughness. Accordingly, in alternative embodiments, the joint members 21a, 21b may be molded out of a rubber material or machined from brass, bronze, copper, aluminum or steel materials, and may be configured differently from the forms depicted in the drawings to attain the desired flexibility and manufacturability.

Referring now to both FIGS. 2 and 3, each joint member 21a, 21b may be viewed as having three portions—a first semi-annular connecting portion 71, a second semi-annular connecting portion 73, and a semi-annular flexible member 75 positioned therebetween. In the embodiments depicted in FIGS. 2 and 3, the first and second insulation connecting portions 71, 73 each have a cross-section configuration or shape similar to the letter "J". Further, each annular "J"-shaped connecting portion 71, 73 includes an anchoring lip 33, 35 turned radially upward into the insulation 27, a substantially flat base section 37, 39 positioned substantially parallel with the outer surface 25 of the pipeline 23, and a radially upstanding face or wall 29, 31 connected to the anchoring lip 33, 35 via the base section 37, 39. The radial height of the upstanding faces 29, 31 (and thus of the mechanical joint 21) are sized in accordance with a desired thickness of the insulation 27 as well as the diameter of the pipeline 23.

The anchoring lips 33, 35 each functions to anchor or lock the mechanical joint 21 onto the adjacent section of insulation 27 and so as to be movable as one piece with the section of insulation 27. Preferably, the anchoring lip 33, 35 has a radial height that is substantially shorter than the height of the upstanding face 31. Further, each anchoring lip 33, 35 has a substantially vertical outer wall 33a, 35b, a narrow top portion 33b, 35b, and a downwardly sloping inside wall 33c, 35c. The semi-annular base sections 37, 39 connect the anchoring lips 33, 35 to the upstanding faces 29, 31 and define therewith a first annular groove 41 and a second annular groove 43 respectively. As best shown in FIG. 3, the upstanding faces 29, 31 border the ends of the insulation sections 27 and may be glued thereto, but the anchoring lips 33, 35 are turned into and embedded (i.e., anchored) in the insulation material 27.

In between the first and second upstanding faces 29, 31, the flexible member 75 provides a substantially flat, elongated cross-member connecting the two upstanding faces 29, 31. As best shown in FIG. 3, the flexible member 75 takes on a substantially diagonal annular orientation. Moreover, a pressure equalization aperture or passage 53 is located through the flexible member 75. Also shown in FIG. 3 are a top annular subspace or "V"-space 55 and a lower subspace or annular "V"-space 57 formed in between the flexible member 75 and one of the first and second faces 29, 31. When the mechanical joint 21 is installed on the pipeline 23 and/or pipeline insulation system, the top "V"-space 55 is open to the external environment, while the lower "V"-space 57 is in open communication with the top "V"-space 55 via the pressure equalization aperture 53. The pressure equalization aperture 53 is particularly advantageous in subsea applications, wherein the hydrostatic pressure is substantially greater than the ambient or atmospheric pressure, because the equalization aperture 53 prevents a large differential pressure to be generated between the two "V"-spaces 55, 57.

Now returning to the view of FIG. 2, the joint members 21a, 21b may be joined together by operation of a mutually interlocking tongue and groove system. Each of the joint members 21a, 21b is equipped at both an upper end 77 and a lower end 79 with either an annular groove 59 or a tongue member 61. Referring to FIG. 2 specifically, the upper ends 77 and lower ends 79 are each mutually connectable via a tongue and groove interlocking connection. In alternative embodiments, the two joint members 21a, 21b may be joined via conventional connection systems. However, applicants have found that the particular tongue and groove systems described herein and depicted in the drawings work to facilitate installation of the insulation system.

FIG. 3 illustrates the configuration of the mechanical joint 21 when the pipe 23 is relatively straight (i.e., not in bending mode). In this mode, the mechanical joint 21 may be referred to as being disposed in a non-flex or at-rest condition (or configuration). FIG. 3 also illustrates a thin layer of a slip fabric such as a polyethylene sheet 69 (e.g., a high-density polyethylene (HDPE)) that is wrapped around the outer surface 25 of the pipe 23 so that the flex joint 21 is gapped or spaced radially from the outer surface 25 of the pipe 23 at a radial distance about equal to the thickness of the sheet 69. Polyethylene is a preferred material because it provides for a relatively low coefficient of friction between it and the insulation section 27 (and the mechanical joint 21). In this way, the mechanical joints 21 and the attached or connected insulation sections 27 have the capacity to float or move in the longitudinal direction relative to the pipe 23, thereby giving the insulation system further flexibility and slippage capability.

In further embodiments, an alternative material for the sheet 69 may be selected which provides a relatively low coefficient of friction between the insulation 27 and the mechanical joints 21, and the outer surface 25 of the pipe 23. Further, the sheet material should exhibit toughness, strength, and durability under the conditions (including thermal) to be expected.

Figure 4:
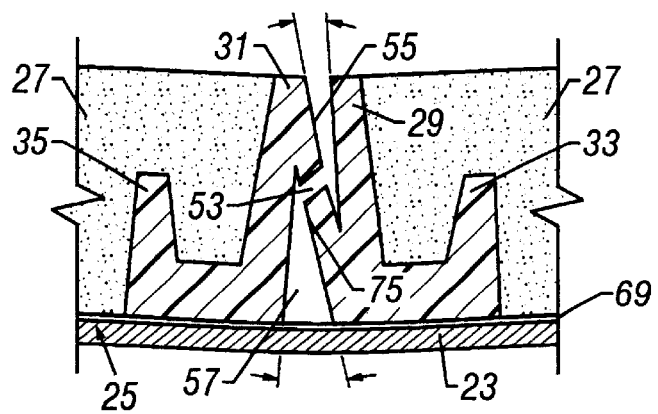
FIG. 4 is a partial cross-sectional view of the mechanical joint of FIG. 3 disposed in compression mode.
Figure 5:
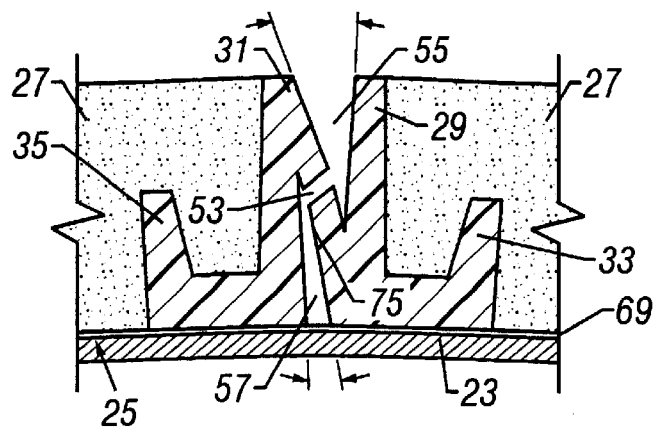
FIG. 5 is a partial cross-sectional view of the mechanical joint of FIG. 4 disposed in tension mode.

FIGS. 4 and 5 illustrate the configuration of the mechanical joint 21 and insulation system when the pipe 23 is in a bending mode. In particular, FIG. 4 illustrates a section of the mechanical joint 21 disposed on the compression side of the pipeline 23 whereas FIG. 5 illustrates a section of the mechanical joint 21 disposed on the corresponding or the opposite tension side of the pipeline 23. In the compression condition illustrated in FIG. 4, the two sections 27 of pipeline insulation are moved closer together due to the bending of the pipe 23, especially in the upper or outer portions of the insulation sections 27. Being substantially rigidly and mechanically interlocked with the anchoring annular lips 33, 35, the rigid insulation section 27 pushes the first face 29 or second face 31 inwardly (toward each other) in a compressive mode. As a result, the flexible member 75 bends and rotates (in the clockwise direction) to allow the faces 29, 31 to move toward each other and to compress the top V-space 55. The flexible member 75 may also be described as shifting relative to the upstanding faces 29, 31. Accordingly, the forces exerted by the faces 29, 31 and the insulation sections 27 (as these move in the longitudinal direction) are absorbed substantially by the mechanical joint 21 (i.e., the flexible member 75) and the compressive or shear forces in the insulation sections 27 are minimized.

In the tension side of the pipeline 23, as illustrated in FIG. 5, the two insulation sections 27 are forced to move apart from each other. In this mode, the flexible member 75 rotates (or shifts) in the opposite direction (in the counterclockwise direction) and functions to absorb the tension and shear stresses otherwise exerted on the insulation sections 27. As a result, the lower V-space 57 is compressed inwardly while the top V-space 55 is expanded outwardly. It should also be noted that in both FIGS. 4 and 5 the polyethylene sheet 69 allow the insulation system and the flex joints 21 to move longitudinally with relative ease with respect to the pipe 23.

It should be further noted that the flexible member 75 is configured from a selected material so as to exhibit, among other properties, durability, resistance to fatigue, and resiliency.

FIGS. 6 through 9 illustrate a method of forming an insulation system utilizing the mechanical joints 21 according to the invention.

Figure 6:
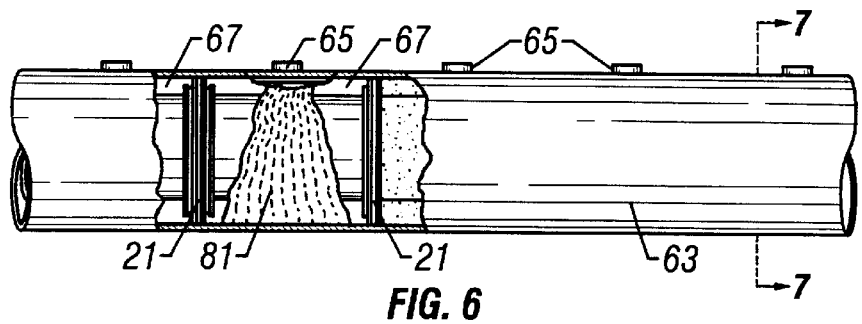
FIG. 6 is a partial side view of a pipeline insulation system during a step in a formation method and including a cut-out view of a compartment being filled with an insulation material.
Figure 7:
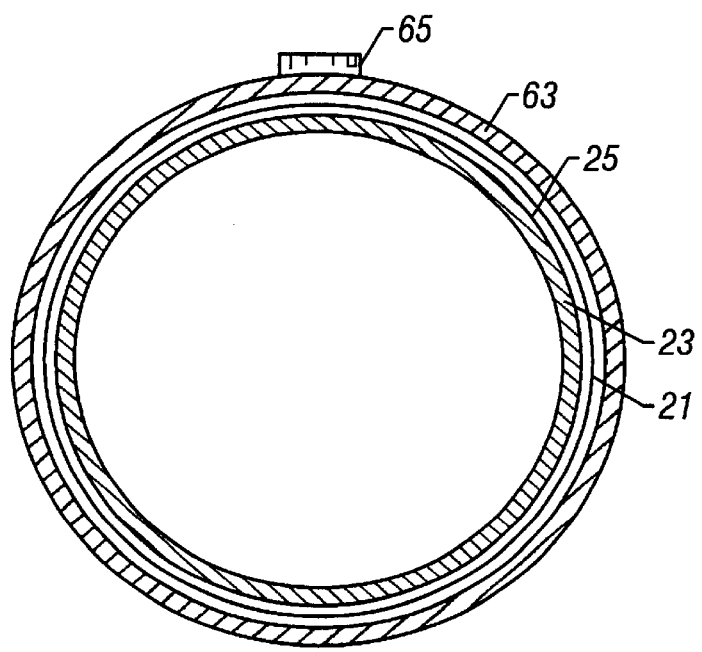
FIG. 7 is a cross-sectional view of the pipeline insulation system across line 7—7 of FIG. 6.

In a preferred method, the mechanical joints 21 are positioned over the pipeline 23 (or other cylindrical member) and spaced apart at predetermined intervals on the pipeline 23. More preferably, a sheet 69 of high-density polyethylene (HDPE) is applied over the outer surface 25 of the pipe 23 and covered with a PVA coating, and the flex joints 21 are then installed over the HDPE sheet 69. Further, a continuous length of cylindrical sonatube cardboard 63 is installed over the flex joints 21. As best shown in FIG. 6, the flex joints 21, the sonatube 63 and the outer surface 25 of the pipe 23 define multiple insulation compartments 67, and a fill nozzle 65 is positioned on the outer surface of the sonatube 63 outside of each compartment 67.

Each fill nozzle 65 provides a communication means with each compartment 67. Through the fill nozzle 65, the compartments 67 may be filled with a slurry-like insulation material 81. In a preferred method, the insulation material is a syntactic composite 81 primarily comprising a plastic resin that is densely impregnated with glass microspheres. The syntactic composite 81 is pumped or otherwise delivered through fill nozzle 65 to densely fill the compartment 67. The compartment 67 is substantially sealed by the sonatube 63 and by the ends of the mechanical joints 21. Moreover, the syntactic material 81 fills the voids of the annular grooves 41, 43 such that, when dry, the frictional engagement between the anchoring lips 33, 35 and the dried insulation 27 mechanically interlocks the mechanical joint 21 and the section of insulation 27.

It should be noted that in this method of forming the insulation system, each mechanical joint 21 advantageously functions as a centering device as well as an end barrier or seal for the compartment 67.

Figure 9:
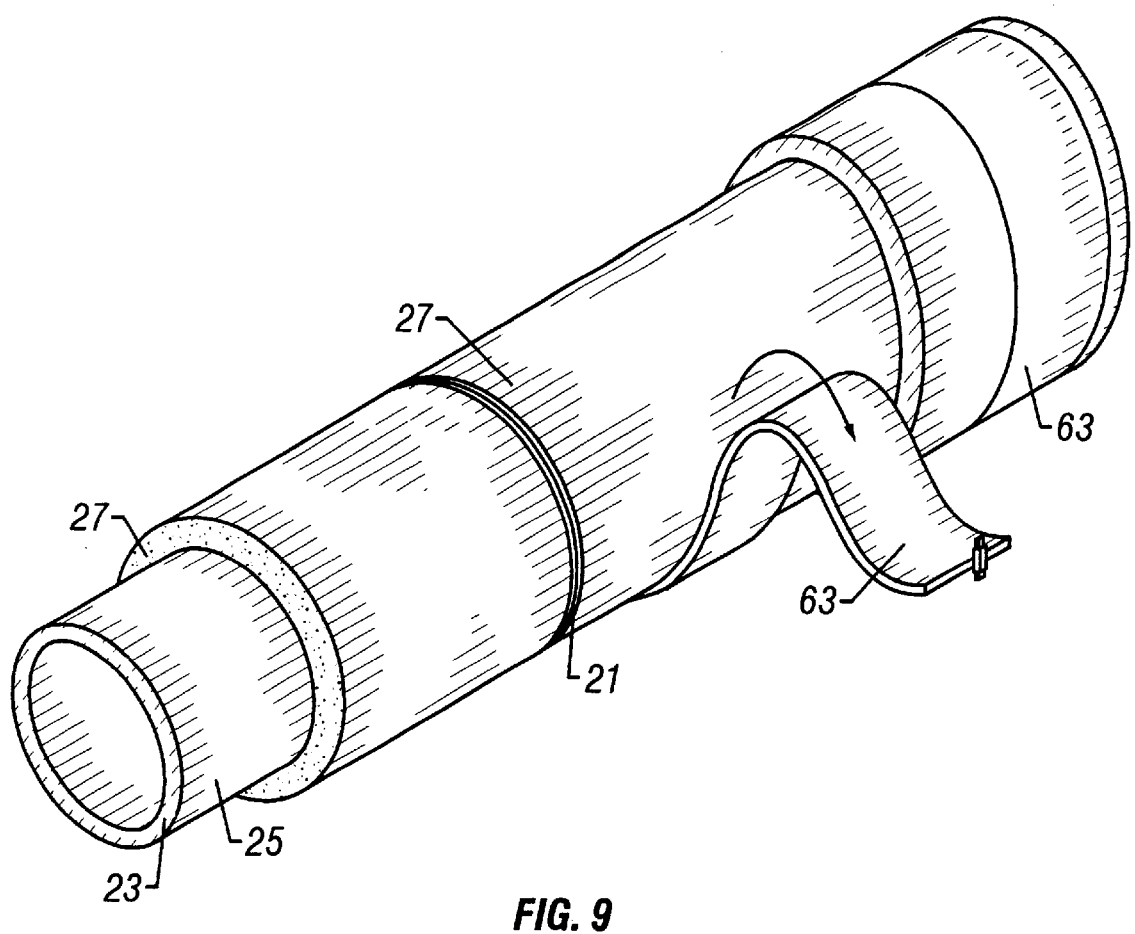
FIG. 9 is a perspective view of a pipeline insulation system during a step in a formation method wherein a sonatube material is peeled off of the insulation material.

FIG. 9 illustrates a latter step in the method of the invention, wherein the material of the sonatube 63 is peeled off to expose an insulation system installed over the pipeline 23. The insulation system, according to the invention, is comprised of discreet sections of insulation 27 bordered by circumferentially upstanding mechanical joints 21 having multi-directional flexibility. Moreover, the application of a polyethylene sheet 69 minimizes the frictional engagement between the insulation sections 27 and the outer surface 25 of the pipe 23 and facilitates longitudinal movement or slippage of the insulation sections 27 relative to the pipe 23 (and vice versa). In alternative embodiments, the syntactic material may be replaced by another suitable insulation material having sufficient compressive strength and exhibiting other properties suitable for the intended installation. For example, concrete provides an adequate insulation material for some deep subsea installations.

In another alternative embodiment, a continuous length of PVC pipe or equivalent plastic piping may be used in lieu of the sonatube. Further, the PVC pipe may be left in place after the syntactic material dries and when the pipeline 23 is installed on the ocean floor. In yet a further alternative embodiment, an insulation material such as blown urethane or polyurethane may be used in combination with the PVC or other plastic pipe. In such an alternative embodiment, the insulation material may not be required to have the high compressive strength and structural rigidity that is offered by the syntactic material or concrete. The requisite structural rigidity and compressive strength are, instead, provided by the outer layer of PVC or other plastic pipe. Moreover, the essentially liquid impervious PVC or plastic pipe and the mechanical joints also provide the desired sealability (over the pipeline) that is advantageous during formation of the insulation system and also when the pipeline is in service (e.g., subsea service).

Figure 11:
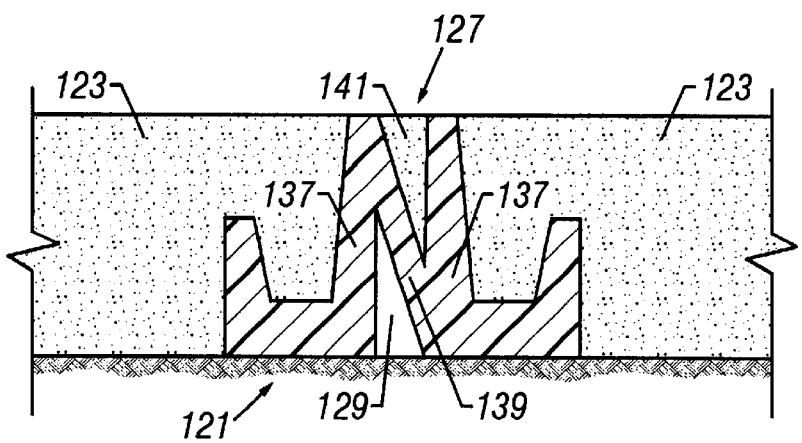
FIG. 11 is a cross-sectional view of the road pavement area of FIG. 10.
Figure 8:
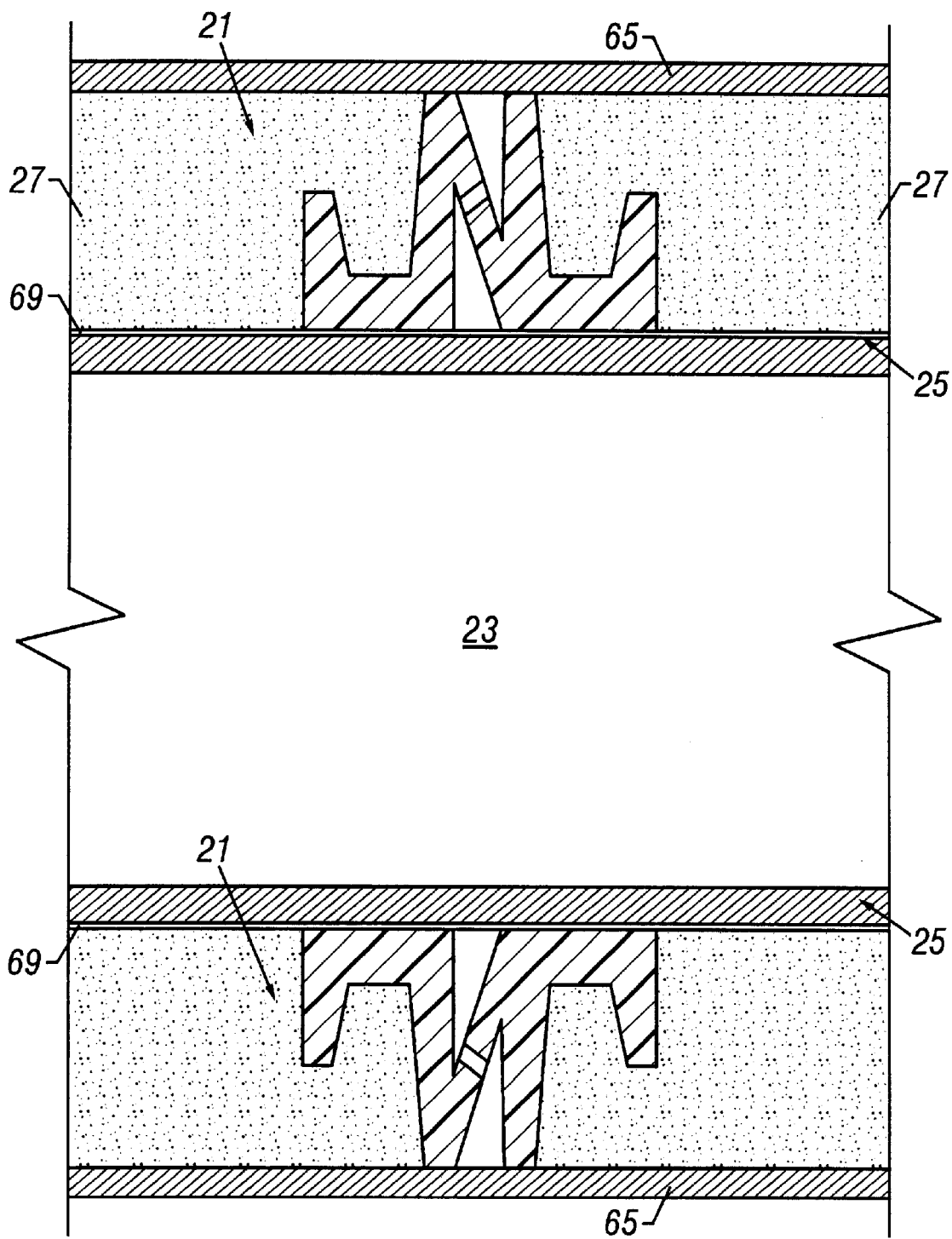
FIG. 8 is a partial longitudinal sectional view of the pipeline insulation system of FIG. 6.
Figure 10:
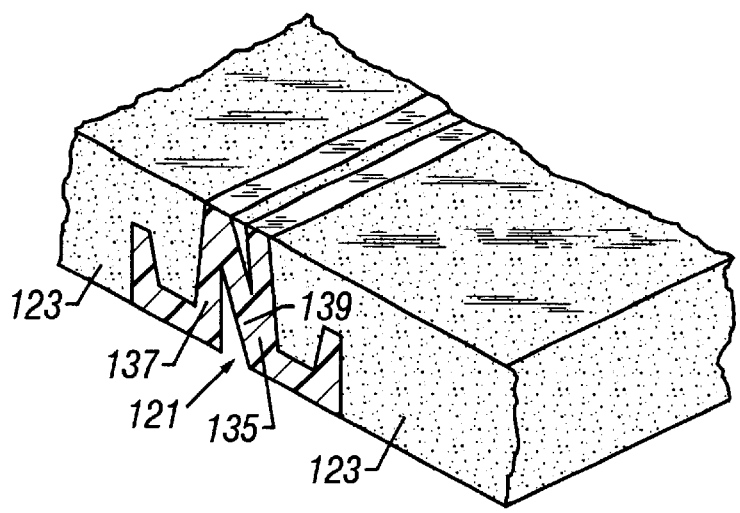
FIG. 10 is a perspective view of a road pavement area that incorporates a mechanical joint according to the invention.

FIGS. 10 and 11 depict an alternative embodiment of the invention wherein a mechanical joint 121 (according to the invention) is used as an expansion joint for sections of road pavements 123 or the equivalent. In this embodiment, the mechanical joint 121 takes the form of a substantially horizontal and elongated flex joint. Note, however, that the mechanical joint 121 of this embodiment has a cross-section that is substantially identical to that of the mechanical joints 21 described previously and depicted in FIGS. 1 through 9. The mechanical joint 121 preferably includes a first connecting portion 135 and a second connecting portion 137, as well as a flexible member 139 that is shiftable or rotatable relative to the connecting portions 135, 137.

Further, the mechanical joint 121 accommodates the longitudinal movement of the adjacent road pavement wall sections in the same or substantially the same manner as described previously with respect to the embodiment in FIGS. 1 through 9. In particular, the mechanical joint 121 has a top V-space 127 that is compressible upon thermal expansion of adjacent road pavement sections 123 and is expandable upon contraction of the same adjacent road pavement sections 123. As shown in FIGS. 10 and 11, the top V-space 127 may be filled with a soft, resilient material such as silicon 141 so as to keep the V-space 127 from accumulating debris, water or other undesirable materials.

The mechanical joint 121 is also equipped with a lower V-space 129 that is similarly expandable and compressible as the top V-space 127 in response to certain environmental conditions, and as similarly described previously with respect to the embodiment in FIGS. 1 through 9. It should be noted that it is common, particularly in road pavement applications, to see a high degree of differential elongation or compression across the height of the mechanical joints 121, due to high or steep temperature gradients. In this regard, the capacity of the mechanical joint 121 of the present invention to respond or absorb large degrees of compression or elongation at one time proves advantageous in these road pavement applications and in similar installations.

Although the first embodiment depicted and described herein primarily relates to the use of a syntactic insulation system, the present invention is also adapted to alternative insulation systems. Further, although the first embodiment depicted and described herein relate to the use of the inventive mechanical joint in connection with an insulation system, the mechanical joint is also adapted for use in connecting adjacent sections other than insulation systems, including but not limited to the road pavement application also described herein.

The foregoing description of the present invention has been presented for purposes of illustration and description. The description is not intended to limit the invention to the form disclosed herein. Consequently, variations and modifications commensurate with the above teachings, and the skill or knowledge of the relevant art, are within the scope of the invention. The embodiments described herein are further intended to explain the best modes known for practicing the invention and to enable others skilled in the art to utilize the invention in such, or other, embodiments and with various modifications required by the particular applications or uses of the present invention. It is intended that the appended claims be construed to include alternative embodiments to the extent that is permitted by the prior art.

What is claimed is:

1. A flexible mechanical joint for joining a first elongated structural section with a second elongated structural section, said joint being compressible and expandable along a substantially longitudinal direction upon movement of at least one of the first and second sections, and wherein said joint and the first and second sections are substantially aligned along said substantially longitudinal direction at least when said joint is in a non-flex condition, said joint comprising:

a first connecting portion having a cross-sectional configuration of a substantially flat base and a radially upstanding face fixedly attached to the first section;

a second connecting portion having a cross-sectional configuration of a substantially flat base and a radially upstanding face fixedly attached to the second section; and a flexible member connecting said first connecting portion with said second connecting portion and positioned therebetween, said flexible member being shiftable relative to said first and second connecting portions upon relative longitudinal movement between the first and second sections;

wherein said first and second connecting portions define at least one variable space therebetween, said variable space having a volume that varies in response to relative movement between the first and second sections along said substantially longitudinal direction; and wherein said flexible member is rotatable within said variable space upon relative movement between the first and second sections.

2. The mechanical joint of claim 1, wherein at least one of said first and second connecting portions includes an anchoring member frictionally engaging one of the first and second sections.

3. The mechanical joint of claim 2, wherein said anchoring member includes a lip secured into the one section.

4. The mechanical joint of claim 1, wherein said flexible member is substantially flat and elongated.

5. The mechanical joint of claim 1, wherein said flexible member is positioned within said variable space to divide said variable space into a first variable subspace and a second variable sub-space.

6. The mechanical joint of claim 1, wherein said first and second connecting portions define a variable space therebetween and said flexible member is positioned within said variable space to divide said variable space into a first variable sub-space and a second variable sub-space, said mechanical joint further comprising a pressure equalization passage fluidly communicating said first sub-space with said second sub-space.

7. The mechanical joint of claim 1, wherein said first connecting portion, said second connecting portion, and said flexible member are substantially annularly configured for mounting of said mechanical joint about a substantially cylindrical member.

8. The mechanical joint of claim 7, wherein said mechanical joint includes a first semi-annular section and a second semi-annular section, said first and second semi-annular sections being configured to mutually interlock to form a substantially annular member.

9. The mechanical joint of claim 8, wherein at least one of said semi-annular sections includes at least one tongue member and the other of said semi-annular members includes at least one groove, said tongue member and groove being mutually engageable to interlock said semi-annular sections.

10. The mechanical joint of claim 1, wherein said joint is formed from a plastic material.

* * * * *